(12) United States Patent
Guyetant et al.

(10) Patent No.: US 8,656,102 B2
(45) Date of Patent: Feb. 18, 2014

(54) METHOD FOR PRELOADING CONFIGURATIONS OF A RECONFIGURABLE HETEROGENEOUS SYSTEM FOR INFORMATION PROCESSING INTO A MEMORY HIERARCHY

(75) Inventors: Stéphane Guyetant, Le Plessis Robinson (FR); Stéphane Chevobbe, Paris (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 511 days.

(21) Appl. No.: 12/866,860

(22) PCT Filed: Feb. 6, 2009

(86) PCT No.: PCT/EP2009/051409
§ 371 (c)(1),
(2), (4) Date: Nov. 10, 2010

(87) PCT Pub. No.: WO2009/098311
PCT Pub. Date: Aug. 13, 2009

(65) Prior Publication Data
US 2011/0055480 A1 Mar. 3, 2011

(30) Foreign Application Priority Data
Feb. 8, 2008 (FR) ...................................... 08 00677

(51) Int. Cl.
*G06F 12/08* (2006.01)
*G06F 9/46* (2006.01)
(52) U.S. Cl.
USPC ................... 711/118; 711/154; 711/E12.016; 712/216; 712/E9.05
(58) Field of Classification Search
None
See application file for complete search history.

(56) References Cited

U.S. PATENT DOCUMENTS

| 6,697,834 B1 * | 2/2004 | Dice ............................ 718/102 |
| 6,871,341 B1 * | 3/2005 | Shyr ............................ 712/227 |
| 6,968,552 B2 * | 11/2005 | Nishimura ................... 718/107 |
| 7,478,204 B2 * | 1/2009 | McKenney et al. ........... 711/151 |

(Continued)

FOREIGN PATENT DOCUMENTS

WO  WO 2004/003738  1/2004

OTHER PUBLICATIONS

Search Report, mailed on Mar. 25, 2009, for PCT/EP2009/051409, filed on Feb. 6, 2009.

*Primary Examiner* — Matthew Bradley
*Assistant Examiner* — Daniel Bernard
(74) *Attorney, Agent, or Firm* — Stroock & Stroock & Lavan LLP

(57) ABSTRACT

A method for preloading into a hierarchy of memories, bitstreams representing the configuration information for a reconfigurable processing system including several processing units. The method includes an off-execution step of determining tasks that can be executed on a processing unit subsequently to the execution of a given task. The method also includes, during execution of the given task, computing a priority for each of the tasks that can be executed. The priority depends on information relating to the current execution of the given task. The method also includes, during execution of the given task, sorting the tasks that can be executed in the order of their priorities. The method also includes, during execution of the given task, preloading into the memory, bitstreams representing the information of the configurations for the execution of the tasks that can be executed, while favoring the tasks whose priority is the highest.

12 Claims, 7 Drawing Sheets

(56) References Cited

U.S. PATENT DOCUMENTS

| | | | |
|---|---|---|---|
| 2002/0062463 A1* | 5/2002 | Hines | 714/38 |
| 2002/0078257 A1* | 6/2002 | Nishimura | 709/318 |
| 2002/0133530 A1* | 9/2002 | Koning | 709/102 |
| 2003/0163671 A1* | 8/2003 | Gschwind et al. | 712/214 |
| 2003/0177086 A1* | 9/2003 | Gomber et al. | 705/37 |
| 2004/0177244 A1 | 9/2004 | Murphy et al. | |
| 2004/0199927 A1* | 10/2004 | Liu et al. | 719/328 |
| 2004/0205755 A1* | 10/2004 | Lescouet et al. | 718/100 |
| 2004/0260884 A1 | 12/2004 | Poznanovic et al. | |
| 2005/0086029 A1 | 4/2005 | Cascaval et al. | |
| 2005/0257200 A1* | 11/2005 | Taylor | 717/136 |
| 2006/0018179 A1* | 1/2006 | Marchal et al. | 365/230.03 |
| 2006/0242385 A1* | 10/2006 | Murakami et al. | 712/200 |
| 2006/0265485 A1* | 11/2006 | Chai et al. | 709/223 |
| 2006/0268310 A1* | 11/2006 | Tamai et al. | 358/1.14 |
| 2006/0294483 A1* | 12/2006 | Mukund et al. | 716/7 |
| 2007/0061594 A1* | 3/2007 | Ginter et al. | 713/189 |
| 2007/0073908 A1* | 3/2007 | Gormley | 710/8 |
| 2007/0075734 A1* | 4/2007 | Ramos et al. | 326/41 |
| 2007/0083730 A1* | 4/2007 | Vorbach et al. | 712/10 |
| 2008/0228408 A1* | 9/2008 | Reiss et al. | 702/19 |
| 2009/0070721 A1* | 3/2009 | Solomon | 716/8 |
| 2010/0037080 A1* | 2/2010 | Kawashima et al. | 713/500 |
| 2010/0333109 A1* | 12/2010 | Milnor | 718/106 |
| 2011/0205042 A1* | 8/2011 | Takemura et al. | 340/435 |

* cited by examiner

METHOD FOR PRELOADING CONFIGURATIONS OF A RECONFIGURABLE HETEROGENEOUS SYSTEM FOR INFORMATION PROCESSING INTO A MEMORY HIERARCHY

CROSS-REFERENCE TO PRIOR APPLICATIONS

This application is the U.S. National Phase application under 35 U.S.C. §371 of International Application No. PCT/EP2009/051409, filed on Feb. 6, 2009, and claims the benefit of French Application No. 080067, filed on Feb. 8, 2008, both of which are incorporated by reference herein in their entirety. The International Application was published on Aug. 13, 2009 as WO/2009/098311.

FIELD

Embodiments of the present invention relate to a method for preloading, into memory, configurations of a reconfigurable information processing system including several processing units of different types. A configuration encompasses any type of information necessary for preparing a digital architecture for the execution of a processing operation. The present invention applies for example in the field of microelectronics or in the field of embedded electronic systems of high computational power.

BACKGROUND

A reconfigurable architecture is an information processing structure that can include for example several hardware processing units, also called "processing cores", whose constituent elements and organization may be adapted so as to carry out a particular processing operation effectively. Such an architecture utilizes a reconfigurable circuit for processing information. The reconfigurable circuit may be for example coarse-grained, of the type of the "eXtreme Processing Platform" architectures produced by the company PACT for example. A coarse-grained reconfigurable circuit includes processing units allowing complex operations such as arithmetic multiplication for example. The reconfigurable circuit can also be a fine-grained circuit, such as an FPGA, the acronym standing for "Field Programmable Gate Array". A reconfigurable circuit of fine grain includes processing units allowing logical operations, for example "or" or "and".

Several modes of reconfiguration exist. A reconfigurable architecture may be reconfigured completely in one go, or else partially and thus enable a part of the application to be carried out effectively. It can also be reconfigured dynamically during processing, that is to say employ a mechanism which allows it to modify its configuration although the processing has not finished. In certain cases, several reconfigurations may be necessary in order to carry out the complete application. A problem with implementing dynamic reconfiguration is the recovery and transfer of the configuration information when passing from one configuration to another, notably because of the time overhead incurred. The set formed by this information can have a structure and a content which is extremely variable. Dynamic reconfigurable architectures suffer from reconfiguration latency which slows down the execution of an application because of the loading into memory of the configuration data prior to the execution of a processing operation.

Systems on chip, commonly encompassed under the acronym "SoC" standing for "System-on-Chip", allow the integration on a single chip of several relatively complex computational elements. SoCs can thus include several reconfigurable cores, optionally of different granularities. Such an architecture is termed "heterogeneous" when the programming formats for the computational elements are not mutually compatible. The programming formats recognized by the various types of computational element may belong to various categories: they may make it possible to carry out iterative programs in the form of instruction streams or in the form of configurations describing the hardware organization of the processing units or else in mixed forms. Different pieces of software must then be used to prepare the formats in question, several compilers for example. Thus, heterogeneous dynamic reconfigurable architectures have no inherent programming model.

Solutions exist which rely on services provided by the operating system. These services are, however, limited in complexity since they are implemented in the form of software drivers which slow down the scheduler or which entail non-compliance with the real-time constraints. Other solutions use a reconfiguration manager, but they are suited rather more to homogeneous multi-core architectures. Finally, tools exist which analyze off-line, that is to say before execution, the behavior of the applications as a function of a dynamic of the inputs. They deduce therefrom a fixed scheduling of the processing operations to be performed and therefore an appropriate order of loading. These solutions do not take account of the randomnesses inherent in execution, which randomnesses often render all the predefined static preloading strategies ineffective. After analysis, it is apparent that the prior art cited above proposes essentially three basic techniques for decreasing or masking the reconfiguration latencies. These techniques are decorrelated from the static or dynamic aspect of the decision making. The first technique consists in compressing and decompressing the bitstreams representing the configuration information. Indeed, to each configuration there corresponds a bitstream which describes the configuration, the bitstream having to be transferred so as to load the corresponding configuration. The second technique consists in preloading bitstreams into cache memory. The third technique consists in reusing the already executed configurations by storing the corresponding bitstream in cache memory. But none of these techniques provides a really significant improvement and dynamic reconfigurable architectures continue to suffer from reconfiguration latencies American patent application U.S. 2004/0260884 A1 describes a reconfigurable system including several reconfigurable processors, one of the processors including a preloading unit making it possible to read and to write data in a shared memory. However, this patent application does not describe the precharging of the bitstreams representing the system configuration information.

SUMMARY

Aspects of the invention notably improves the computational performance of dynamically reconfigurable architectures by masking the reconfiguration latencies, that is to say by judiciously preparing the forthcoming reconfigurations while the computational cores continue to execute their main processing operations. Accordingly, embodiments of the invention propose notably that the configuration bitstreams be preloaded into memory in a predictive manner. This is why, hereinafter, a device according to an embodiment of the invention may be designated by the acronym "PCM" standing for "Predictive Configuration Manager". Accordingly, embodiments of the invention provide a method for preloading into a hierarchy of memories, bitstreams representing the configuration information for a reconfigurable information processing system including several processing units of different types, a configuration describing a possible logical organization of the processing units which is suited to the execution of a given task. The method includes a step, off-execution, of determining the tasks that can be executed on a processing unit of a given type subsequently to the execution of the given task. It also includes a step, during execution of the given task, of computing, for each of the tasks that can be executed, a priority dependent on information relating to the current execution of the given task. It also includes a step, during execution of the given task, of sorting the tasks that can be executed in the order of their priorities. It also includes a step, during execution of the given task, of preloading into the hierarchy of memories, bitstreams representing the information of the configurations useful for the execution of the tasks that can be executed, while favoring the tasks whose priority is the highest.

Advantageously, the preloading of the configurations may be interrupted upon the issuing by an operating system of a memory load request, said load request being processed first, so that the preloading method does not slow down the operation of the system. The memory may be a hierarchical memory.

For example, for each type of processing unit, a dependency graph may be constructed, the graph indicating the tasks that can be executed on a processing unit of the given type subsequently to the execution of the given task.

Advantageously, the dependency graph may be constructed by using, for each task that can be executed on a processing unit of the given type subsequently to the execution of the given task, an algorithm description graph.

For example, the priority of a task that can be executed may be a weighted sum of N parameters $p_i$, $i \in \{1, \ldots, N\}$ where N is a nonzero integer, each parameter $p_i$ in the sum possibly being raised to a power $n_i$ where $n_i$ is a nonzero integer, parameters $p_i$ possibly being provided dynamically by an operating system during execution. Parameters $p_i$ can also be provided statically before execution.

The priority of a task that can be executed can depend on process priorities provided by an operating system. It can also depend on the relative computational load of the processing units of the given type. It can also depend on the mean duration of execution on the processing units of the given type. It can depend on the probabilities of executing the conditional instructions in the given task.

Advantageously, the configurations may be preloaded into the hierarchy of memories as blocks of bits of parametrizable size.

The method may be implemented in the form of a hardware module, the reconfigurable system being a system on chip. The hardware module can then include a cache memory.

In addition to the fact that it makes it possible to make relevant choices of preloading, embodiments of the invention provides that the information that it generates dynamically also allows it to collaborate with the scheduler so as to provide it with an accurate value of the time required to load a configuration onto a computational core. The scheduler can integrate this configuration time into the execution time of a task. During nominal operation, this value ought ideally to be zero. It should be noted that embodiments of the present invention do not increase the overall time required for the computation of a schedule. Moreover, the embodiments of the invention also mask the heterogeneity of the architecture to the scheduler by offering it a unified configuration interface and by itself carrying out the allocation of the tasks on the computational resources available in the architecture during execution. The execution program therefore has no knowledge of the heterogeneity, embodiments of the invention handling part of the control of the computational cores.

BRIEF DESCRIPTION OF THE DRAWINGS

Other characteristics and advantages of the invention will become apparent with the aid of the description which follows, offered in relation to appended drawings which represent.

DETAILED DESCRIPTION

Figure 1:
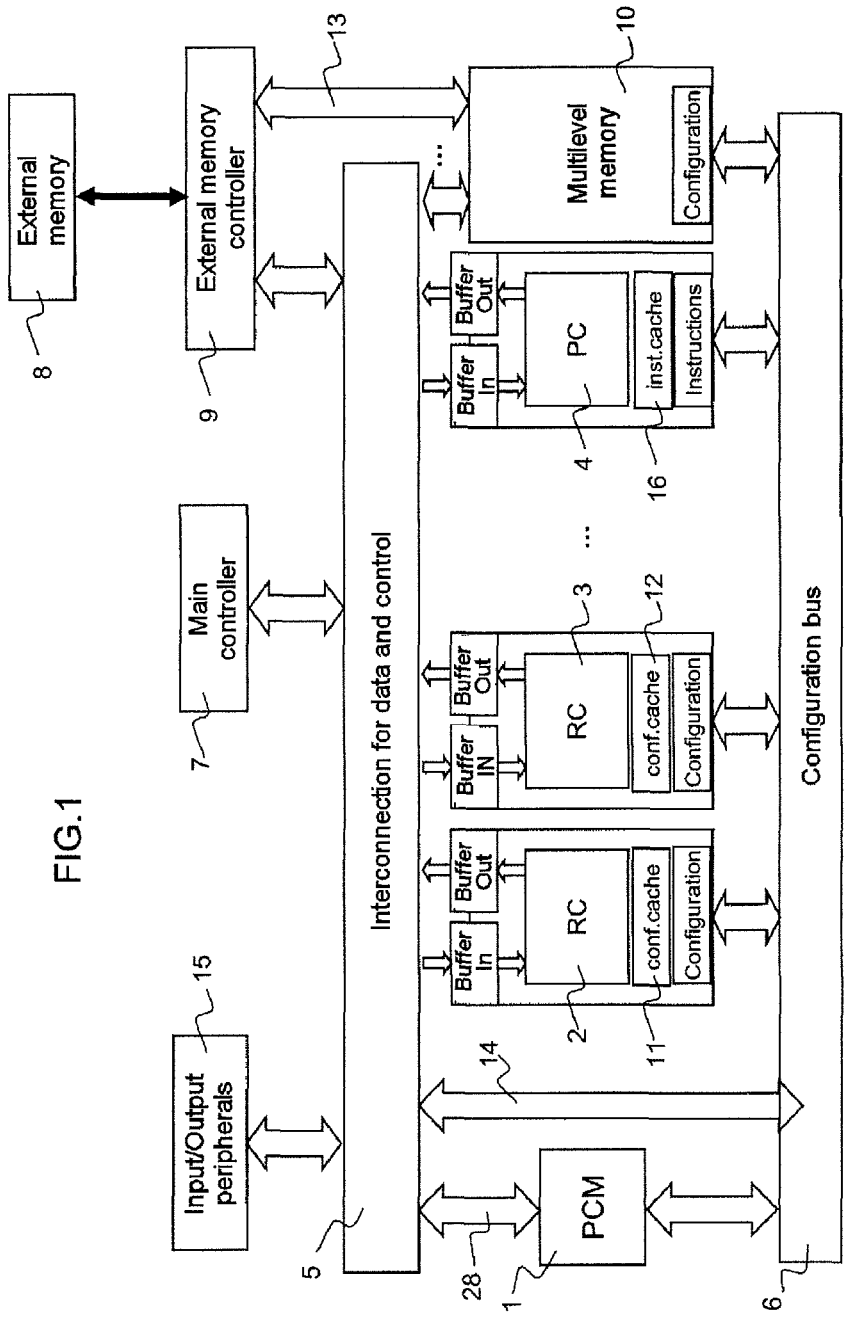
FIG. 1, an illustration by a diagram of an exemplary heterogeneous reconfigurable architecture whose reconfiguration latencies may be masked by a device according to an embodiment of the invention.

FIG. 1 illustrates by an architecture diagram a typical exemplary organization of an SoC for which an embodiment of the invention affords an improvement in performance. The device according to an embodiment of the invention is represented by a PCM component 1. Advantageously, the PCM component 1 according to an embodiment of the invention may be a hardware component of the reconfigurable circuit type integrated into an architecture of reconfigurable SoC type. The PCM component 1 includes an interface 28 with an operating system, the acronym "OS" standing for "Operating System". The interface 28 is detailed in FIG. 3. A set of computational cores may be interconnected on the one hand by a data interconnection and execution control network 5, and on the other hand by a configuration bus 6. Input/output peripherals 15 are connected to the network 5. This interconnection scheme is not limiting because the configuration can also be done on a single, non-dedicated, interconnection network: for example, if a bridge 14 becomes a continuity of the interconnection. The set of computational cores includes for example reconfigurable cores 2 and 3, denoted "RC" for "Reconfigurable Core", as well as programmable computational cores such as the core 4 denoted "PC" for "Programmable Core". The architecture thus constituted is heterogeneous: the formats for programming the cores RC 2 and RC 3 in the form of configurations are not necessarily compatible with one another or with the format for programming the core PC 4 in the form of instruction streams. The exemplary heterogeneous dynamic reconfigurable architecture of FIG. 1 therefore has no inherent programming model.

A main controller 7 may be implemented in the form of specialized components, of the type of an "Operating System accelerator on Chip" in accordance with the publication by Nicolas Ventroux " Contrôle en ligne des systèmes multiprocesseurs hétérogènes embarqués: élaboration et validation d'une architecture" [On-line control of embedded heterogeneous multiprocessor systems: devising and validating an architecture], or more conventionally with a programmable microprocessor as in the example of FIG. 1. For example, the controller 7 may be in charge of a real-time operating system. In a variant embodiment, the PCM hardware component 1 according to the invention could be replaced with a software component offering the same services. The software component could then be executed on the controller 7, for example in the form of a driver of the operating system. A dedicated interconnection 13 makes it possible to accelerate the retrieving of the configurations from controllers of exterior memories 9 and therefore from exterior mass memories 8, so as to transfer them for example to a memory 10 including a hierarchy having several levels of internal memories. Certain levels of the memory 10 may be allocated to the services for managing the configurations of the PCM component 1 according to an embodiment of the invention. Hereinafter, these levels of the memory 10 will be called "local configuration memory". For each computational core 2, 3 and 4, a memory, respectively 11, 12 and 16, is a configuration cache dedicated to this core. Homogeneous cores can share the same cache or have several dedicated caches. Together, the set of exterior memories, memories 10 making up the system, cache memories 11, 12 and 16, as well as constituent configuration memory planes of the reconfigurable cores is called the configuration memory hierarchy, without it being necessary for all these levels to be represented in the architecture. The PCM component 1 according to an embodiment of the invention can copy entire or piecewise configurations between the various levels of the hierarchy of configuration memories. To facilitate the management of the retrieved configurations, the latter may be split up into memory blocks whose size is parametrizable and can vary from a few hundred bits or of bytes up to several kilo-bits or kilo-bytes. The PCM component 1 can control the copying of blocks into the various configuration memories 10, 11, 12 according to the method described hereinafter.

As stated previously, the PCM component 1 according to an embodiment of the invention makes it possible to preload the configuration bitstreams into memory in a predictive manner. The predictions rely notably on dynamic information generated during execution. The dynamic information may be communicated by other controllers of the circuit, such as for example the process priorities provided by the microprocessor 7 playing the role of scheduler. In an embedded device, the charge remaining in the battery could be one such item of dynamic information. Commands entered via a man-machine interface could also form part of this dynamic information. The PCM component 1 itself can also generate dynamic information, such as for example the relative computational load of each type of core RC or PC, or else the mean duration of execution on each type of core RC or PC. The PCM component 1 can also dynamically supplement the static information provided by "profiling" tools, notably the probabilities of executing the conditional instructions. The dynamic information generated or supplemented with the PCM component 1 accords the architecture a property of self-adaptation with respect to the execution conditions. The predictions also rely on purely static information: the dependencies between the configurations. The realizations of these dependencies can optionally be deduced from the chaining together of the calls during execution. Thus, it is possible to predict that if a given configuration must be loaded, then another configuration will necessarily have to be loaded subsequently. Anticipating the calls makes it possible to improve the reactivity of the architecture to the execution commands by retrieving the configurations at the appropriate opportunity.

Figure 2:
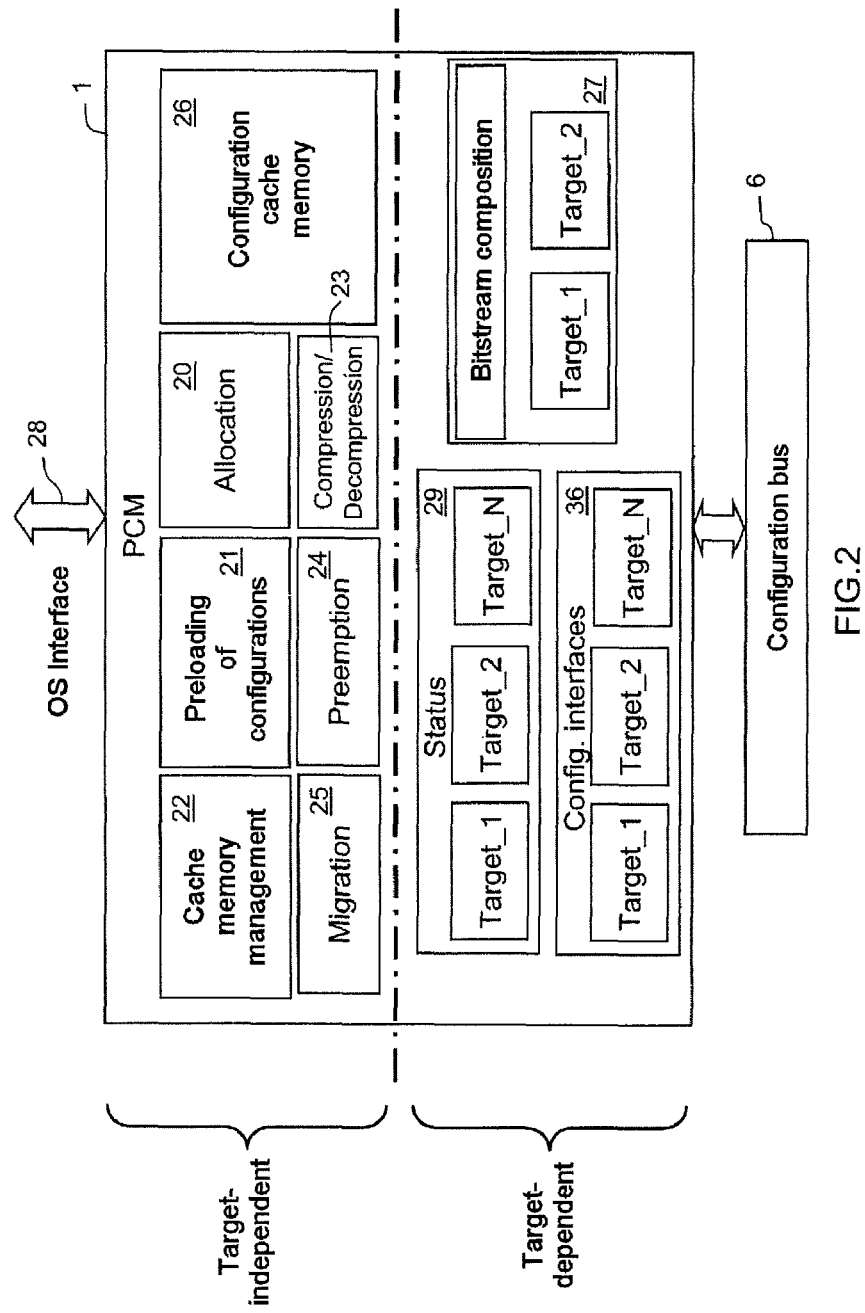
FIG. 2, an illustration by a diagram of an exemplary functional architecture of a device according to an embodiment of the invention.

FIG. 2 illustrates by a diagram an exemplary internal functional architecture of the PCM component 1 according to an embodiment of the invention, each module offering a service. It can include a module 20 for allocating the tasks on the heterogeneous set of computational cores formed by the cores RC 2, RC 3 and PC 4. Each of the computational cores RC 2, RC 3 and PC 4 can thus constitute a potential target denoted "Target_1" to "Target_N". Certain services provided by the PCM component 1 are dependent on the target core, others are not. Concerning the services dependent on the target core, the PCM component 1 can include a configuration cache memory 26 for storing configurations, a module 21 for preloading the configurations, a module 22 for placing the configurations in cache memory, a preemption module 24, a migration module 25 and a module 23 for compressing and decompressing the bitstreams. Concerning the services dependent on the target core, the PCM component 1 can include a module 27 for manipulating bitstreams allowing notably the composition of the bitstreams of two targets "Target_1" and "Target_2", as well as the transformation of imprint from one target to another. It should be noted that the configuration cache memory 26 could be external to the PCM component 1, just like the services dependent on the target core considered, which may be sited remotely, as close as possible to the computational cores. The PCM component 1 also includes a module 29 which contains information on the state of the resources, information made available to the OS, and a module 36 which manages the specifics of the protocols for loading each computational core.

Figure 3:
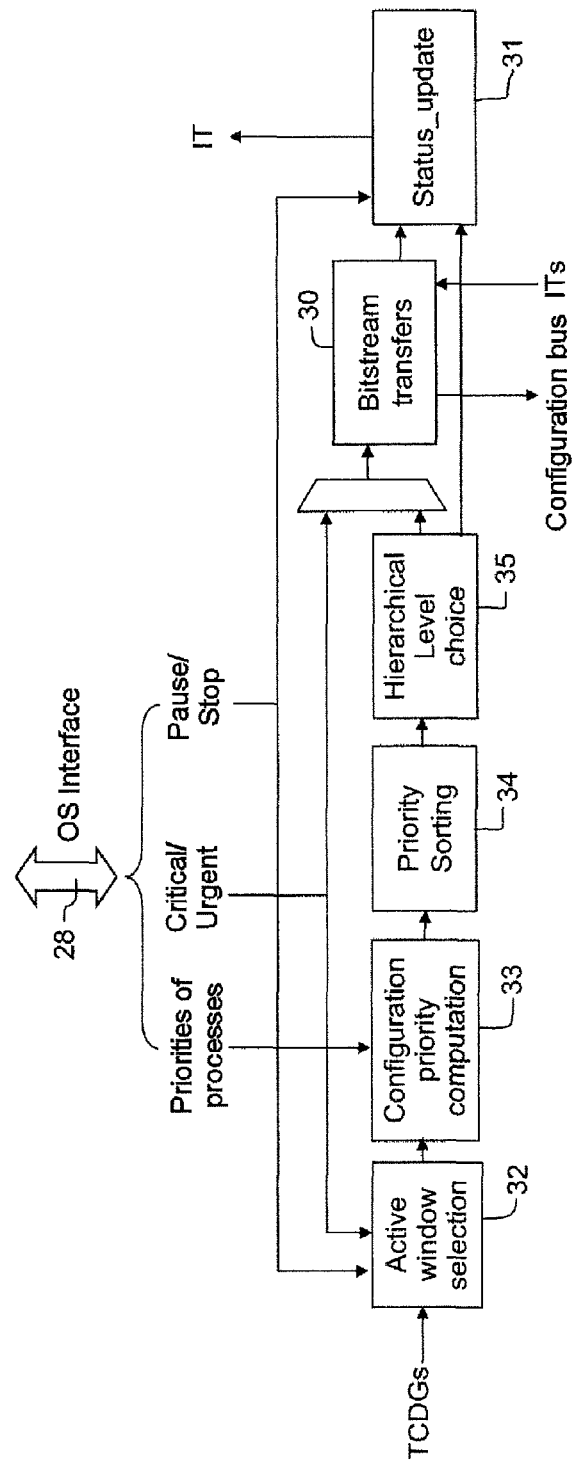
FIG. 3, an illustration by a functional diagram of an exemplary processing chain according to an embodiment of the invention.

FIG. 3 illustrates by a diagram an exemplary processing chain embodied by the PCM component 1 according to an embodiment of the invention. This chain makes it possible to combine, during execution, dynamic information provided by the operating system with static information arising from the design of the application. The interface 28 allows notably the modules 20, 21 and 22 to receive from the operating system dynamic information such as process priorities represented by a "thread priorities" stream, critical or urgent load requests represented by a "Critical/Urgent" stream, task execution pause or end requests represented by a "Pause/End" stream. In addition, the modules 20, 21 and 22 can use purely static information, namely the algorithm description graphs. This may be a dependency graph of the configurations, which graph is commonly designated by the acronym "CDG" standing for "Configuration Dependency Graph". In the same way, the modules 20, 21 and 22 can also use a control and data dependency graph, commonly designated by the acronym "CDFG" standing for "Control-Data Flow Graph". These graphs make it possible to determine faster ways of carrying out computational tasks, by virtue for example of one or more hardware implementations on one or more optionally heterogeneous targets. For each graph provided by the developers and for each type of target, a graph called "TCDG" according to an acronym standing for Tile-dependent configuration dependency graph" can advantageously be derived. The format of the TCDG is specific to an embodiment of the present invention. The construction of the TCDG is detailed hereinafter in the light of FIGS. 4 to 9. Then, FIG. 3 will be considered again so as to detail how the TCDG may be used according to an embodiment of the present invention.

Figure 4:
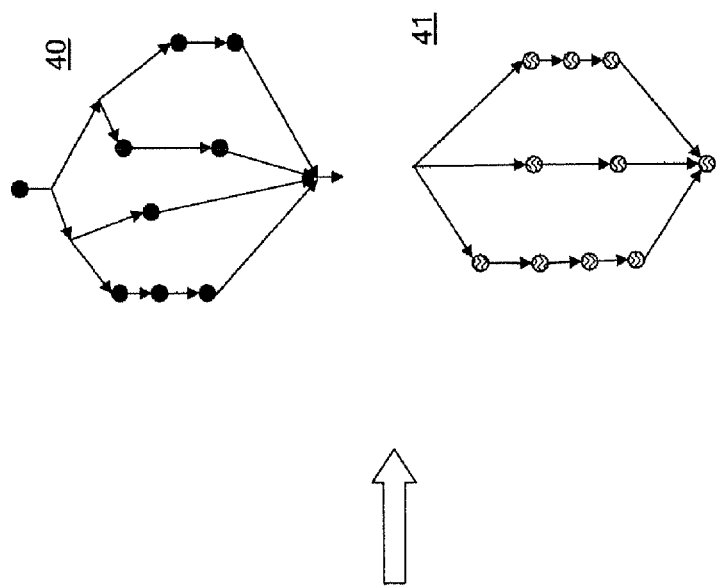
FIG. 4, an illustration by task dependency graphs of the principle of the allocating of tasks when designing the application and of the deriving of a configuration dependency graph extracted for homogeneous cores according to an embodiment of the invention.
Figure 4:
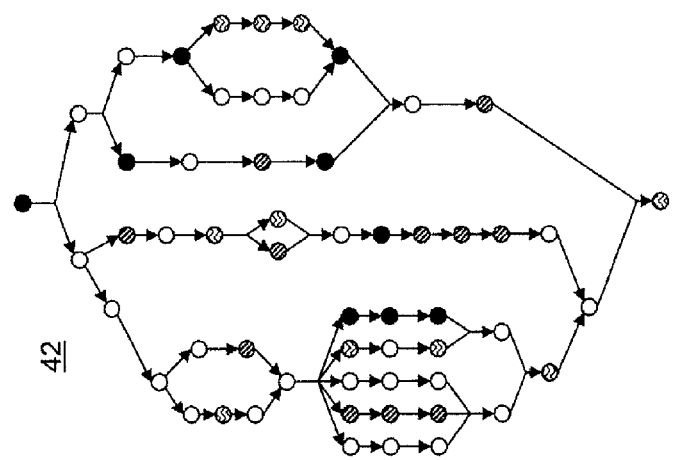

FIG. 4 illustrates, by task dependency graphs, on the one hand the principle of the task allocation performed by the developer when designing an application, and on the other hand the derivation of two configuration dependency graphs according to an embodiment of the invention. On the basis of a task dependency graph 42 of CCG or of CDFG type provided by the developers of the application for each of the processes of said application, or else of the single process constituting the application, two TCDGs 40 and 41 may be derived. For each CDG or CDFG provided to describe the application or applications, each type of reconfigurable or programmable core present in the targeted architecture gives rise to the creation of a different TCDG. In the graph 42, the black tasks are to be executed preferably on a target of a first type, the chevron-patterned tasks are to be executed preferably on a target of a second type. Task typing does not exist in the conventional CCG or CDFG formats. An embodiment of the invention proposes to add this typing into the graph 42 by virtue of a thorough knowledge of the implementational choices made by the developers of the application. Indeed, the developers can provide a priority in the choice of the type of target if several implementations of one and the same software task are possible. The TCDGs 40 and 41 correspond to the tasks that can be executed on a target of the first type and on a target of the second type respectively.

Figure 5:
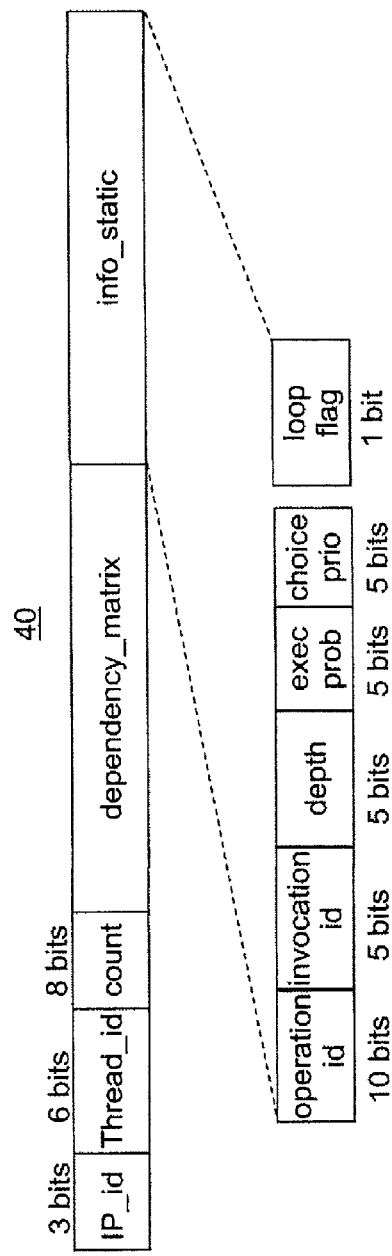
FIG. 5, an illustration of an exemplary data structure making it possible to represent a configuration dependency graph according to an embodiment of the invention.

FIG. 5 illustrates an exemplary data structure making it possible to represent the TCDG 40 according to an embodiment of the invention. The field sizes in terms of number of bits are given only by way of example and can vary from one implementation to another. The TCDG 40 may be defined in a unique manner by a field "IP_id" containing a target identifier and a "thread_id" field containing a process identifier. The TCDG 40 can also include a "count" field containing a number of hardware tasks and a "dependency_matrix" field containing a dependency matrix which describes the links between the nodes. The TCDG 40 can also include an "info_static" field which contains all the static information available for the development of the application. In the example of FIG. 5, all the nodes of the TCDG 40 include an "info_static" field. The "info_static" field can itself be composed of several fields, as illustrated in the example of FIG. 5. It can notably include a "exec_prob" field containing a probability of execution provided by the "profiling" tools. It can also include a "depth" field containing a depth representative of the number of existing nodes in the original graph, which may be simplified between two nodes of the TCDG. The "depth" field makes it possible to differentiate between two branches in the TCDG which one has the greatest chance of being executed first. It can also include an "operation_id" field containing a software task identifier. It can include an "invocation_id" field containing a call identifier, it being possible for one and the same task to appear several times in the graph. It can include a "choice_prio" field containing a priority of choice in the case of several implementations of one and the same software task, as stated previously. Finally, it can include a "loop_flag" field containing a loop signal, it is used to maintain the bitstreams in the cache memory 26 during a loop. During the execution of a task, the PCM component 1 according to an embodiment of the invention searches through the TCDG 40 for the daughter tasks liable to be the next to be called on the target. Accordingly, the information of the "info_static" field is copied into a data structure described in FIG. 6.

Figure 6:
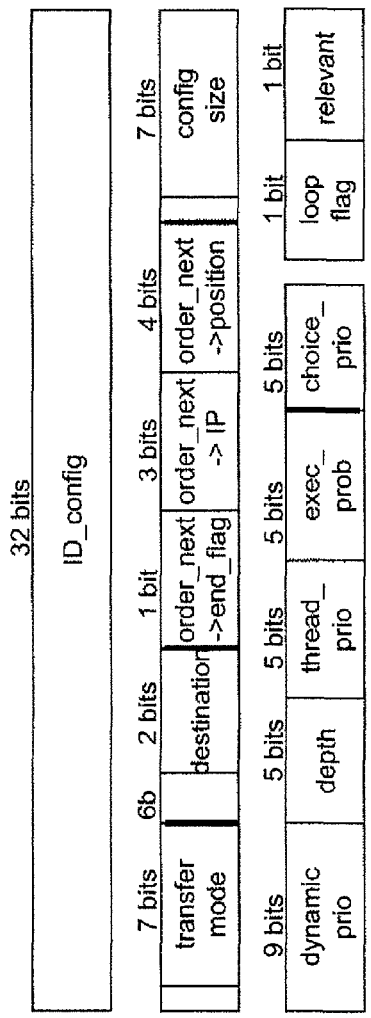
FIG. 6, an illustration of an exemplary data structure making it possible to represent a daughter task according to an embodiment of the invention.
Figure 7:
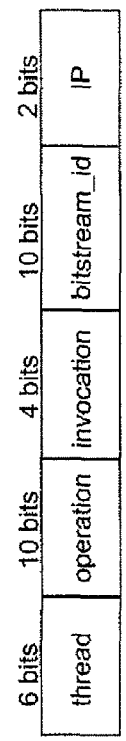
FIG. 7, an illustration of an exemplary data structure making it possible to represent a configuration identifier according to an embodiment of the invention.

FIG. 6 illustrates an exemplary data structure making it possible to represent a daughter task. The field sizes in terms of number of bits are given only by way of example and can vary from one implementation to another. This daughter task structure can include an "ID_config" field containing a configuration identifier which is detailed in FIG. 7. FIG. 7 illustrates an exemplary data structure making it possible to represent a configuration identifier. Thus, the "ID_config" field can itself include a "thread" field containing a process number, an "operation" field containing a software task identifier, an "invocation" field containing a call number in the TCDG 40, a "bitstream_id" field containing a configuration file identifier and an "IP" field containing a hardware target. It should be noted that the "bitstream_id" and "IP" fields are redundant since a bitstream is necessarily associated with a given target. The daughter task structure of FIG. 6 can also include a "relevant" field containing a Boolean of validity and a "loop_flag" field containing a loop signal. It also contains all the above-described information of the "info_static" field. It can include a "depth" field containing a dynamic depth which tends to zero. It can include a "thread_prio" field containing a process priority such as provided by the operating system. The daughter task structure can also include a "config_size" field containing the size in terms of number of blocks of the associated configuration file. It can include a "destination" field containing a dynamically decided destination memory. It can include a "transfer_mode" field containing a number of blocks to be copied, this number being decided dynamically. It includes a dynamic priority computed according to an embodiment of the invention on the basis of dynamic information and on the basis of static information. In the example of FIG. 6, this dynamic priority is contained in a "dynamic_p_rio" field. Numerous methods can make it possible to compute the dynamic priority. For example, the dynamic priority $P_d$ may be a weighted sum of N parameters $p_i$, $i \in \{1, \ldots, N\}$ where N is a nonzero integer, each parameter $p_i$ in the sum being raised to a power $n_i$ where $n_i$ is a nonzero integer:

$$P_d = \sum_{i=1}^{N} a_i p_i^{n_i}$$

The values of certain parameters $p_i$ may be provided dynamically by the operating system during execution, the values of other parameters $p_i$ may be provided statically before execution. The various possible choices of parameters $p_i$ and of weighting coefficients $a_i$ constitute various possible policies for guiding the choice of the destination memory and the number of blocks to be copied. Thus, the PCM component 1 according to an embodiment of the invention is adaptable to numerous particular cases of applications. The values of dynamic priority are computed so as to sort all the structures of daughter tasks identified at a given instant, in descending order for example. Three fields prefixed by "order_next" can serve for the chaining of the structures of daughter tasks after sorting, "order_next->position" and "order_next->IP" fields enabling the next node to be uniquely identified. An "order_next->end_flag" field can signal that the last node has been reached. The PCM component 1 according to an embodiment of the invention can read the sorted list of structures of daughter tasks and can copy blocks in the order of chaining. It can copy blocks as long as, on the one hand, available memory still remains and as long as, on the other hand, new orders for loading into memory are not sent by the scheduler of the operating system. Should new load orders be given by the scheduler, they can be processed under high priority. The identification of the daughter tasks and their sorting may be resumed subsequently.

As illustrated by FIG. 3, by coupling with the operating system, the PCM component 1 according to an embodiment of the invention can have two modes of operation. Indeed, the prediction chain according to an embodiment of the invention may or may not be activated. When the prediction chain is not activated, the operating system is responsible for the scheduling of the loadings and executions of the processing operations. In this case, the PCM component according to an embodiment of the invention is driven by the operating system, which sends it commands for loading and freeing the resources. When the prediction chain is activated, the PCM component according to an embodiment of the invention tracks the execution of the processing operations as a function of the commands sent by the operating system, while itself scheduling the preloads.

Figures 8, 9:
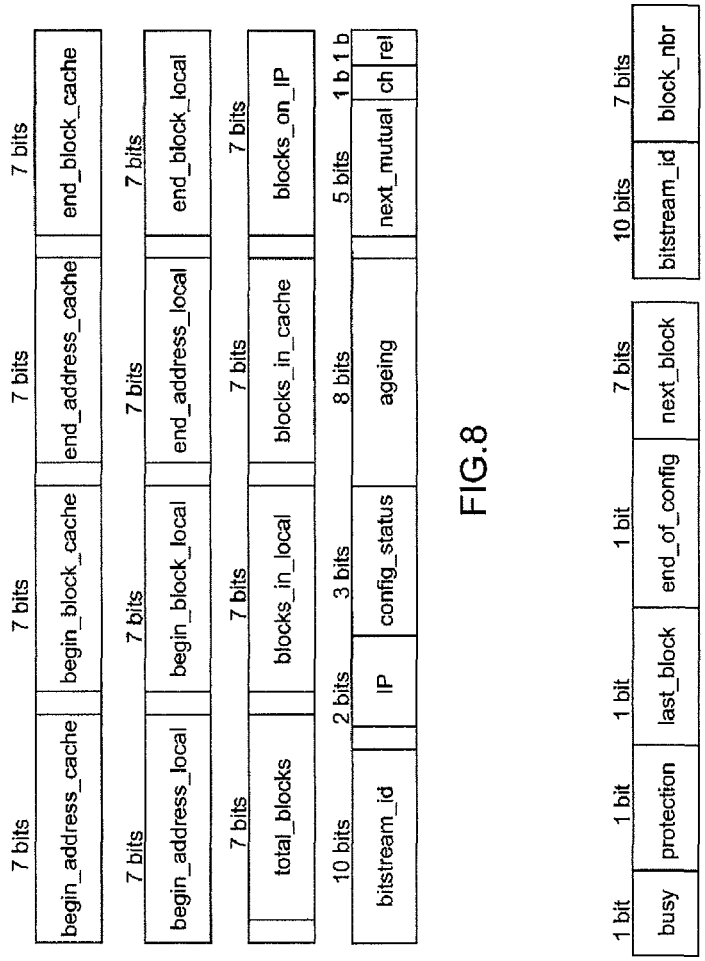
FIG. 8, an illustration of an exemplary data structure making it possible to represent a configuration descriptor according to an embodiment of the invention.
FIG. 9, an illustration of an exemplary data structure making it possible to represent a memory index line according to an embodiment of the invention.

FIG. 8 illustrates an exemplary data structure making it possible to represent a configuration descriptor. The field sizes in terms of number of bits are given only by way of example and can vary from one implementation to another. It is this configuration descriptor which, when it is transformed into a stream of bits, can form a bitstream. When a bitstream copy is decided by the PCM component 1 according to an embodiment of the invention, whether this be subsequent to a direct instruction of the operating system or so as to carry out a preload instructed by its predictions, the PCM component 1 can reserve this configuration descriptor structure in memory. Such a structure can include a "rel" field containing a Boolean of validity of the structure. It can also include a "ch" field containing a Boolean which signals whether the bitstream may be exclusive of another, in the case of an "or" divergence or for concurrent implementations for example. It can include a "next_mutual" field containing a pointer to an optional concurrent descriptor. It can include a "ageing" field containing an integer representing the ageing of the descriptor and allowing the cleaning of the unused structures. It can include a "config_status" field containing an integer representing the configuration state, that is to say indicating whether the configuration is partially retrieved or whether it is ready to be executed. It can include "bitstream_id" and "IP" fields containing integers which respectively identify the bitstream and the target. It can include a "blocks_on_IP" field containing an integer which characterizes the number of blocks loaded onto the target. It can include a "blocks_in_cache" field containing an integer which characterizes the number of blocks present in cache memory. It can include a "blocks_in_local" field containing an integer which characterizes the number of blocks present in local memory. It can include a "total_blocks" field containing an integer which characterizes the total number of blocks already retrieved, it is the sum of the three fields cited previously. It can also include "begin_address_cache" and "begin_address_local" fields which each contain an integer representing the address of the first block in cache memory and in local memory respectively. An "end_address_cache" field and an "end_address_local" field can each contain an integer which represents the address of the last block in cache memory and in local memory respectively. A "begin_block_cache" field and a "begin_block_local" field can each contain an integer which represents the number of the first block in cache memory and in local memory respectively. An "end_block_cache" field and an "end_block_local" field can each contain an integer which represents the number of the last block in cache memory and in local memory respectively. It should be noted that the blocks loaded into the memory form a continuous chain, but that they are arranged in a non-contiguous manner.

FIG. 9 illustrates an exemplary data structure making it possible to represent a memory index line. The field sizes in terms of number of bits are given only by way of example and can vary from one implementation to another. Indeed, to facilitate the recovery of the blocks and to update the configuration descriptors, a data structure representing the indexed content of the various memories is used. Such a structure can include a "busy" field containing a Boolean of validity. It can also include a "protection" field containing a Boolean which signals the protection of the block. This field serves to protect the configuration of which the block forms part. A memory index line structure can also include a "last block" field containing a Boolean which signals the end of a chain of blocks. It can also include an "end_of_config" field containing a Boolean which signals whether the end corresponds to the end of a configuration. It can also include a "next_block" field containing a pointer to the next block if the current block is not at the end of the chain. It can include a "bitstream_id" field containing an integer which identifies the bitstream. Finally, it can include a "block_nbr" field containing an integer which represents the block number and which makes it possible to identify the position of the block in the bitstream. For each block present in memory, an index line structure such as that described by FIG. 9 may be created in memory.

As illustrated by FIG. 3, a chain of processing operations starts immediately upon receipt of a command sent by the operating system via the interface 28.

On receipt of a load request, the missing blocks of the configuration file may be loaded directly by a "bitstream_transfers" function 30 which can transfer the bitstreams to a "status_update" function 31. On the basis of these bitstreams, the "status_update" function 31 can update the data structures illustrated in FIG. 8, which represent the configuration descriptors.

In parallel, the prediction chain may be triggered so as to carry out preloads according to an embodiment of the invention. First of all, an "active_window_selection" function 32 can use the TCDGs 40 and 41 constructed as explained previously. These TCDGs make it possible to deduce the hardware tasks liable to be executed. The "active_window_selection" function 32 can retrieve these tasks into daughter-task structures illustrated in FIG. 6. Then, a "configuration_priority_computation" function 33 can compute the dynamic priorities of the selected tasks. Thereafter, the selected tasks can be sorted by a "priority_sorting" function 34, in descending order of their dynamic priorities for example. Finally, a "hierarchical_level_choice" function 35 chooses, as a function of the room available in the memories, the locations for the best blocks to be retrieved. Advantageously, the preloading according to an embodiment of the invention can be performed only when the "bitstream_transfers" transfer function 30 and the "status_update" update function 31 are available, that is to say when they are not processing load requests originating directly from the operating system. Thus, embodiments of the invention do not slow down the loadings ordered by the operating system, even if its predictions are wrong.

The present invention is not limited to the embodiments described herein; reference should be had to the appended claims.

The invention claimed is:

1. A method for preloading, into a hierarchy of memories, bitstreams representing configuration information for a reconfigurable information processing system comprising a plurality of processing units of different types, the configuration describing a possible logical organization of the processing units which is suited to the execution of a given task, the method comprising:
   determining off-execution tasks that can be executed on a processing unit of a given type subsequently to execution of the task;
   during execution of the given task, computing, for each of the tasks that can be executed, a priority dependent on information relating to the current execution of the given task;
   during execution of the given task, sorting the tasks that can be executed in the order of their priorities; and
   during execution of the given task, preloading, into the hierarchy of memories, bitstreams representing the information of the configurations useful for the execution of the tasks that can be executed, while favoring the tasks whose priority is the highest,
the method further comprising, for each type of processing unit, constructing a dependency graph (Tile-dependent Configuration Dependency Graph (TCDG)) indicating the tasks that can be executed on the processing unit of the given type subsequently to execution of the given task, wherein the dependency graph (TCDG) is constructed by using, for each task that can be executed on the processing unit of the given type subsequently to the execution of the given task, an algorithm description graph (Configuration Dependency Graph (CDG) or Control-Data Flow Graph (CDFG)).

2. The method as claimed in claim 1, wherein the preloading of the configurations is interrupted upon issuing of a memory load request by an operating system, said load request being processed first, so that the preloading does not slow down operation of the operating system.

3. The method as claimed in claim 1, wherein the priority of one of the tasks that can be executed depends on process priorities provided by an operating system.

4. The method as claimed in claim 1, wherein the priority of one of the tasks that can be executed depends on a relative computational load of the processing units of the given type.

5. The method as claimed in claim 1, wherein the priority of one of the tasks that can be executed depends on a mean duration of execution on the processing units of the given type.

6. The method as claimed in claim 1, wherein the priority of one of the tasks that can be executed depends on probabilities of executing conditional instructions in the given task.

7. The method as claimed in claim 2, wherein the memory is a hierarchical memory.

8. The method as claimed in claim 1, wherein the configurations are preloaded into the hierarchy of memories as blocks of bits of parametrizable size.

9. The method as claimed in claim 1, wherein the method is implemented in a hardware module, the reconfigurable system including a system on chip.

10. The method as claimed in claim 9, wherein the hardware module comprises a cache memory.

11. A method for preloading, into a hierarchy of memories, bitstreams representing configuration information for a reconfigurable information processing system comprising a plurality of processing units of different types, the configuration describing a possible logical organization of the processing units which is suited to the execution of a given task, the method comprising:
   determining off-execution tasks that can be executed on a processing unit of a given type subsequently to execution of the task;
   during execution of the given task, computing, for each of the tasks that can be executed, a priority dependent on information relating to the current execution of the given task;
   during execution of the given task, sorting the tasks that can be executed in the order of their priorities; and
   during execution of the given task, preloading, into the hierarchy of memories, bitstreams representing the information of the configurations useful for the execution of the tasks that can be executed, while favoring the tasks whose priority is the highest,
   wherein the priority of the task that can be executed is a weighted sum of N parameters $p_i$, $i \in \{1, \ldots, N\}$ where N is a nonzero integer, each parameter $p_i$ in the sum being raised to a power $n_i$ where $n_i$ is a nonzero integer, parameters $p_i$ being provided dynamically by an operating system during the execution.

12. The method as claimed in claim 11, wherein parameters $p_i$ are provided statically before execution.

* * * * *